July 28, 1942.   R. M. MAGNUSON   2,291,049
VALVE
Filed Nov. 8, 1939   2 Sheets-Sheet 1
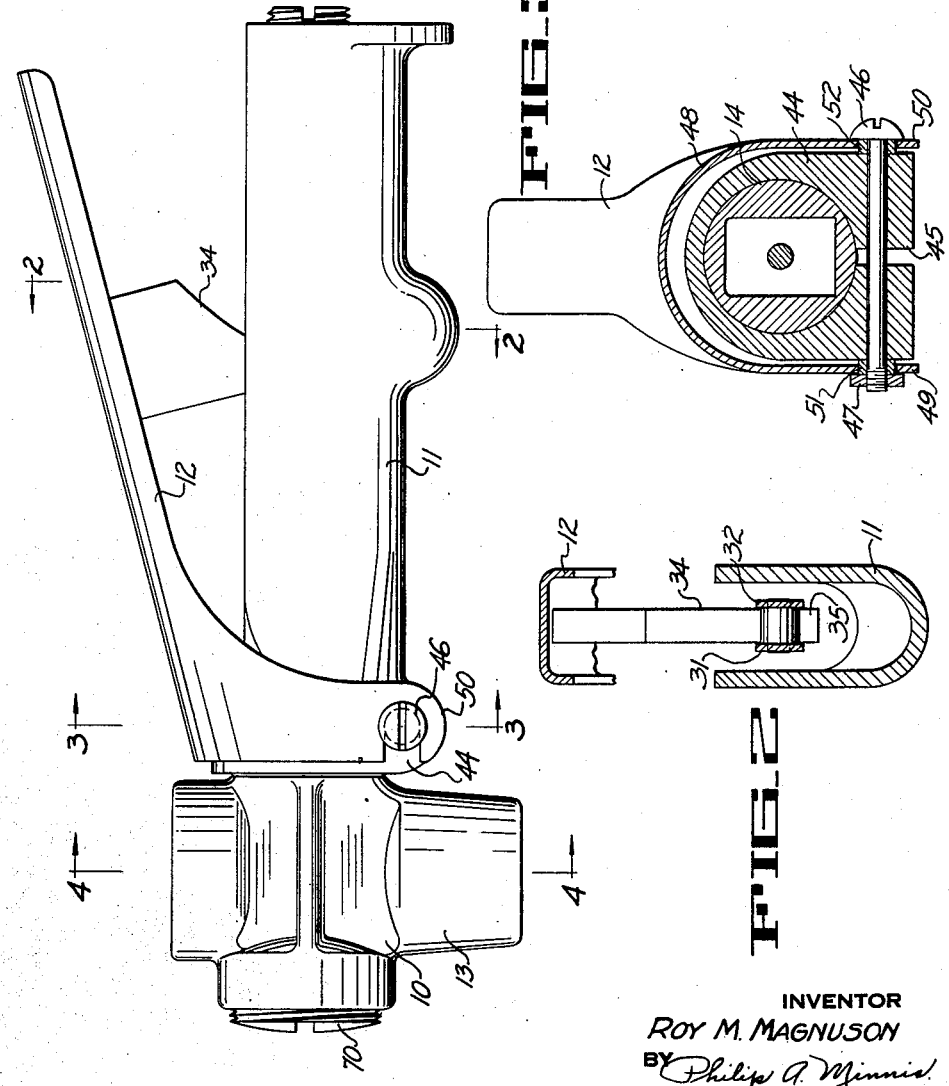
INVENTOR
Roy M. Magnuson
BY Philip A. Minnis
ATTORNEY July 28, 1942.  R. M. MAGNUSON  2,291,049
VALVE
Filed Nov. 8, 1939  2 Sheets—Sheet 2
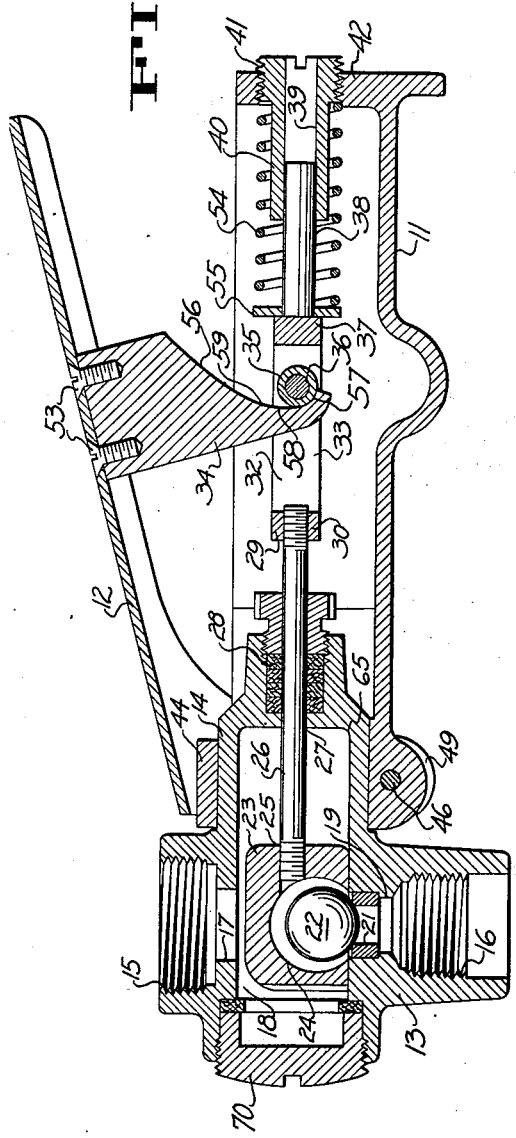
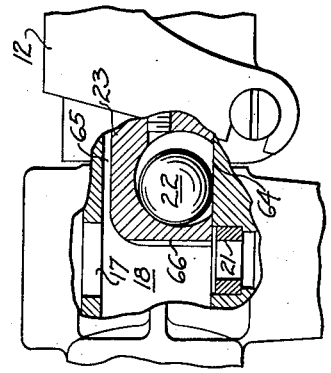
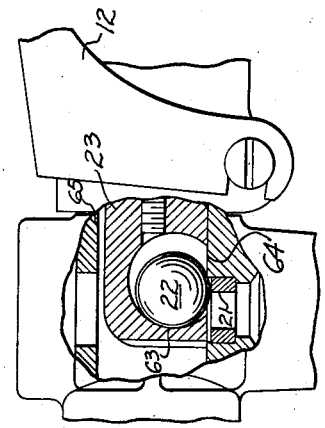
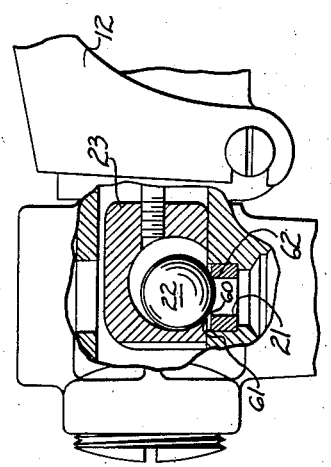
INVENTOR
ROY M. MAGNUSON
BY Philip A. Minnis
ATTORNEY Patented July 28, 1942

2,291,049

UNITED STATES PATENT OFFICE 2,291,049

VALVE

Roy M. Magnuson, Campbell, Calif., assignor to Food Machinery Corporation, San Jose, Calif., a corporation of Delaware Application November 8, 1939, Serial No. 303,416

16 Claims. (Cl. 251—134)

This invention relates to valves of the ball type in which means are provided for positively removing the ball from its seat to open the valve for flow of the medium therethrough.

One of the objects of my invention is to provide a ball-type valve in which the ball is moved laterally off its seat a sufficient distance to entirely remove it from the path of flow to the orifice.

Another object is to provide an actuating means for the valve which utilizes the pressure of the medium within the valve chamber to aid in opening the valve.

Another object is to provide a hand-grip operating means for the valve, which means can be adjusted angularly with respect to the valve proper for the convenience of the operator.

Another object is to provide an actuator for removing the ball from its seat by rolling and which includes a wedge for starting the ball up off its seat.

Other objects of my invention will appear in the course of the description of a device in which my invention has been embodied.

In the drawings:

Fig. 1 is a side elevation of the valve.

Fig. 2 is a transverse section taken as indicated by arrows 2—2 in Fig. 1.

Fig. 3 is a transverse section taken as indicated by arrows 3—3 in Fig. 1.

Fig. 4 is a transverse section taken as indicated by arrows 4—4 in Fig. 1.

Fig. 5 is a vertical longitudinal section of the valve.

Figs. 6, 7, and 8 show successive stages in the removal of the ball from its seat.

The exterior aspect of the valve is shown in Fig. 1. The valve body 10 has attached thereto a finger grip 11 and a movable palm-pressure lever 12 by means of which the operator opens the valve in the body 10 by a squeezing grip, as will appear more clearly after a disclosure of the valve and actuator mechanism.

In general configuration the valve body 10 comprises two intersecting cylinders, the cylinder 13 being disposed with its axis vertical and the cylinder 14 with its axis horizontal. The former contains the flow chamber and valve proper while the latter contains a pocket into which the actuator removes the ball from the flow chamber when the valve is opened.

The vertical portion 13 of the valve body 10 (Fig. 4) has a threaded aperture 15 for attachment of the inlet pipe and, in vertical axial alignment therewith, a threaded aperture 16 for attachment of the outlet pipe. The inlet 17 admits the fluid to the flow chamber 18 from which it exits through the outlet 19. The outlet 19 is formed to receive a sleeve or bushing 20 which provides the orifice 21 and seat for the ball 22. The inlet 17, orifice 21, and outlet 19 are in axial alignment to permit straight-line flow of the fluid through the flow chamber 18 (Figs. 4 and 5). The removable plug 70 is provided to facilitate assembly of the valve.

The ball 22 is drawn off its seat by an actuator which comprises a claw 23 (Fig. 5) having a C-shaped opening 24 in which the ball 22 is disposed at all times. The claw 23 has a threaded aperture 25 into which the end of a rod 26 is threaded. The rod 26 extends axially of the portion 14 of the valve body through an aperture 27 provided with sealing means 28. The outer end of the rod 26 is threaded into the end 29 of a rectangular member 30, the side walls 31, 32 (Fig. 2) of which provide a slot 33 (Fig. 5) to admit a cam 34 which acts upon a roller 35 supported on a stub shaft 36 mounted in the side walls 31, 32. The other end 37 of the member 30 has a guide pin 38 integral therewith. The pin 38 slides in a bore 39 in a sleeve 40 threaded at 41 into the end wall 42 of the finger grip 11.

The finger grip 11 is a casting which is secured to the portion 14 of the valve body. In shape it resembles a trough throughout the major portion of its length. As can be seen in Fig. 2, it is U-shaped in cross-section, the top being open. However, this trough-shaped portion merges into a clamp 44 which encompasses the cylindrical portion 14 (Fig. 3) of the valve body and is split at 45. A long screw 46 and nut 47 serve to tighten the clamp 44 on the valve body so that the finger grip can be adjustably affixed to the valve body. If it is more convenient for the operator in certain circumstances the finger grip can be turned to an angular position on the cylindrical portion 14 by reason of the adjustable clamp 44.

The palm-pressure lever 12 pivots on the screw 46. The end of the lever adjacent the valve body is U-shaped as shown at 48 (Fig. 3) and is provided with hooks 49, 50 which engage spacers 51, 52 on the screw 46.

The cam 34 is attached to the lever 12 by screws 53 (Fig. 5). The roller 35 is pressed against the cam 34 by a compression spring 54 interposed between the shoulder on the sleeve 40 and a washer 55 on guide pin 38 bearing against the end 37 of the member 30 which carries the roller 35. The camming edge of the cam 34 consists of a substantially straight edge 56 merging with an arcuate edge 58 which ends in a hook 57. In the position of the parts shown in Fig. 5 the spring 54 is urging the roller against the cam which holds the lever 12 spread open. The opening of the lever is limited by engagement of the hook 57 with the roller 35 which thus prevents further counterclockwise oscillation of the lever on its pivot 46.

To open the valve the operator wraps his fingers around the grip 11, places his palm against the lever and squeezes. The cam edge 56 forces the roller back against the pressure of its spring 54, and the rod 26 by means of the claw 23 removes the ball 22 from its seat 21. Different stages of the removal are illustrated in Figs. 6, 7, and 8.

In valves of the ball type the maximum effort is required in the initial unseating of the ball because of the differential pressure. As soon as the valve begins to open (Fig. 6) the fluid can flow through the opening 60 and equalization of the pressure on the ball results in easy movement of the ball thereafter. In accordance with my invention this initial opening of the valve is facilitated by reason of the fact that the V-shaped edge 61 of the claw 23 is applied to the ball in close proximity to its point of contact with the seat 21 and that it has a powerful wedging or prying action on the ball, causing the ball to roll up off its seat, rotating on the point 62 as a fulcrum. The initial opening of the valve is further facilitated by the design of the cam 34. When the claw 23 moves from the position shown in Fig. 5 to that in Fig. 6 the point of contact between the roller 35 and the edge of the cam moves to the point 59. In this way a considerable movement of the lever 12 is utilized to do the work of starting the ball off its seat with a resulting decrease in the pressure necessary to be applied to the lever. After the valve has been cracked, very little effort is required to open it wide so the cam edge becomes steeper after the point 59 is reached in order to accelerate the movement.

Continued movement of the claw 23 (Fig. 7) causes the ball 22 to be embraced by the curved portion 63 of the C-shaped opening and the ball is rolled up off the edge of the seat 21 and onto the floor 64 of the pocket 65 into which the ball 22 and claw 23 are withdrawn (Fig. 8). The front face of the claw 23 has a vertical groove 66 which registers with orifice 21 to provide an unobstructed passage through the flow chamber 18. The ball 22 and its claw 23 being disposed outside the path of flow in the side chamber or pocket 65, the fluid is free to flow directly from the inlet 17 through the flow chamber 18 and out the orifice 21.

When the operator releases the lever 12 the spring 54 pushes the rod 26 forward and the claw 23 reseats the ball in the orifice 21.

Although the spring 54 is rather stiff, only a slight pressure need be applied to the lever 12 to open the valve. This is due to the fact that a differential pressure is exerted by the medium on the actuator 23. Because of the rod 26 the pressures on areas of the claw 23 normal to the axis of rod 26 are unbalanced and the resultant force urges the actuator to the right (Fig. 5). Consequently once the ball has been started off its seat as in Fig. 6 this force is sufficient to open the valve; in other words, to move the actuator from the position shown in Fig. 6 to that in Fig. 7 or 8. However, in order to bias the valve toward the closed position the spring 54 is selected so as to have just sufficient force to overcome the force exerted by the differential pressure and to return the valve to its seat when the operator releases the lever 12. The spring 54 may be replaced by another spring of different strength if the valve is to be operated under different fluid pressure by unscrewing the sleeve 40. Within certain limits the counter-acting spring pressure can be adjusted by screwing the sleeve 40 in or out. But in any event, the pressure of spring 54 is by selection and adjustment such that it just overcomes the resultant force of the differential pressure on the valve so that in spite of the fact that the valve may be operating under very high pressures only a slight effort is required on the part of the operator to open and close it.

It will be noted that the means for operating the valve, comprising the grip 11, lever 12, cam 34, and the roller and spring assembly are adjustable as a unit with respect to the valve proper, comprising the valve body and its chambers and passages, the ball, the claw 23, and the rod 26. This is effected by the clamp 44 and is made possible by the construction of the valve operating means which permits it to be rotated as a unit around the axis of the rod 26 and cylindrical body portion 14 without altering the mechanical relation of its parts with respect to the parts of the valve proper. The valve operating means maintains its operativness in any angular position and is simply held by the clamp 44 in whatever position is most convenient for the operator under the conditions.

While I have described a particular embodiment of the present invention, it will be obvious that various changes and modifications may be made in the details thereof without departing from the spirit of the present invention and the scope of the appended claims.

Having thus described my invention and in what manner the same may be used, what I claim as new and desire to protect by Letters Patent is:

1. A valve comprising a chamber having a first portion and a second portion, an inlet and an outlet in said first portion, the path of flow of a fluid medium being from said inlet through said first portion of said chamber to said outlet, said path being substantially a straight line, a ball to close said outlet, and an actuator movable in a line perpendicular to said straight-line path of flow for drawing said ball into said second portion of said chamber where said ball and actuator are disposed outside the path of flow while the valve is open, said actuator having a sliding bearing on the wall of said chamber with which said actuator is held in contact by the pressure of the medium, whereby said actuator is confined to reciprocatory movement.

2. A valve comprising a valve body having a cylindrical portion, valve closure means, including a reciprocatory rod extending axially of said cylindrical body portion and projecting outside said body through an aperture therein provided with a seal, valve operating means operatively connected to said rod for imparting reciprocation thereto and mounted externally on said cylindrical body portion for rotatable adjustment relative thereto, whereby said valve operating means may be adjusted to any convenient angular position with respect to said rod axis while maintaining operative connection with said rod.

3. A valve comprising a chamber having an outlet, a ball adapted to seat in said outlet, a reciprocatory actuator in said chamber adapted to engage said ball on one side to move said ball from its seat and adapted to engage said ball on the opposite side to move said ball to its seat, a spring urging said actuator to close the valve, and a cam to move said actuator to open the valve.

4. A valve comprising a chamber having an inlet and an outlet, a ball adapted to seat in said outlet, and a reciprocatory actuator having an opening in which said ball is loosely retained, whereby said ball can be moved to and from its seat by reciprocation of said actuator, said actuator having an edge which first engages said ball at a point near the seat to apply the initial lift to start the ball off its seat.

5. A valve comprising a body having a chamber therein, said chamber having an outlet, a ball to close said outlet, a spring-pressed actuator extending into said chamber adapted to engage said ball on one side to move said ball from said outlet and adapted to engage said ball on the opposite side to move said ball to said outlet, a cam adapted to reciprocate said actuator, and a pivoted lever to move said cam.

6. A valve comprising a body having a chamber therein, said chamber having a wall, said wall having an aperture therein, a ball in said chamber adapted to close said aperture, and means to remove said ball from said aperture including a wedge in said chamber having a surface slidable on said wall, an edge adapted to engage said ball near said aperture to start said ball rolling up out of said aperture, and a second surface inclined to said first surface to exert a wedging action on said ball as it is rolled up out of said aperture.

7. A valve comprising a body having a chamber therein, said chamber having an outlet, a ball to close said outlet, an actuator in said chamber to remove said ball from said outlet, a hand grip secured to said body, a lever pivoted on said hand grip, spring-pressed means mounted in said hand grip for moving said actuator, said means including a roller, and a cam on said lever engaging said roller.

8. A valve comprising a body having a chamber therein, said chamber having an outlet, a ball to close said outlet, an actuator to remove said ball from said outlet, a hand grip adjustably attached to the valve body, a member connected to said actuator having a roller and a guide pin thereon, said pin being guided in said hand grip, a spring between said member and said hand grip for urging said actuator to close the valve, and a lever pivoted on said hand grip having a cam to engage said roller to withdraw said actuator to open the valve.

9. A valve comprising a body having a chamber therein, said chamber having a wall, an aperture in said wall, a ball in said chamber adapted to seat in said aperture, reciprocable means for rolling said ball along said wall to and from its seat, said means including a member having an opening therein to loosely embrace said ball and thereby permit said ball to drop into its seat and rise therefrom, a part of the opening in said member being defined by a surface inclined to said wall and terminating in an edge at said wall, said edge contacting said ball adjacent said aperture to start said ball rolling up out of its seat, said surface being inclined so as to act as a wedge and to continue the combined lifting-rolling action on the ball to remove said ball from said aperture onto said wall.

10. A valve comprising a ball adapted to seat in an orifice, means to open the valve comprising a wedge adapted to be slid across the orifice, and means including a cam for actuating said wedge, said cam having a portion formed to impart initially slow motion and great force to said wedge to facilitate overcoming the differential pressure on said ball and another portion formed to accelerate the motion to quickly open the valve after the differential pressure on the ball has been overcome.

11. A valve comprising a chamber, having apertures through which a fluid under pressure may flow, a ball to close one of said apertures, an actuator for said ball mounted for reciprocation, said actuator having surfaces exposed to the fluid in said chamber, the projected areas of said surfaces in planes normal to the line of reciprocation of said actuator totaling a greater area on one side of said planes than on the other whereby the fluid exerts an unbalanced force on said actuator acting along the line of reciprocation of said actuator and in a direction to move said actuator to open said aperture, and mechanical means to overcome said unbalanced force and move said actuator to close said actuator.

12. A valve comprising a chamber, having apertures through which a fluid under pressure may flow, a ball to close one of said apertures, an actuator for said ball mounted for reciprocation, said actuator having surfaces exposed to the fluid in said chamber, the projected areas of said surfaces in planes normal to the line of reciprocation of said actuator totaling a greater area on one side of said planes than on the other whereby the fluid exerts an unbalanced force on said actuator acting along the line of reciprocation of said actuator and in a direction to move said actuator to open said aperture, spring means exerting a force on said actuator sufficient to move said ball to said aperture against said unbalanced force, and hand-operated means to move said actuator to open said valve.

13. A valve comprising a body having a chamber therein, said chamber having a wall, said wall having an aperture therein, a ball in said chamber adapted to close said aperture by seating engagement therewith, and means for moving said ball transversely to the axis of said aperture, said moving means enclosing said ball and including a wedge portion slidable on said chamber wall and having its leading edge disposed to engage said ball at a point immediately adjacent said aperture to pry said ball from seating engagement with said aperture.

14. A valve comprising a chamber, a ball therein, said chamber having an outlet providing a seat for said ball, the axis of said seat passing through the center of said ball when said ball is in contact with said seat, an actuator for removing said ball from said seat to a position where said ball is entirely out of alignment with said chamber outlet to leave an unobstructed passage through said chamber to said outlet, said actuator housing and engageable with opposite sides of said ball and having a wedge portion slidable on a chamber wall and engageable with the ball at a point adjacent said seat for urging the ball therefrom, and means to move said actuator in a direction perpendicular to the axis of said seat.

15. A valve comprising a closed chamber having an inlet and an outlet, a ball in said chamber adapted to seat in said outlet, a member in said chamber for unseating said ball, said member having a curved surface disposed in sliding engagement with a wall of said chamber terminating in an edge portion adapted to engage said ball adjacent its seat to cause the ball to roll outwardly therefrom, the point of contact between the ball and said member thereafter progressing from said edge along said curved surface as the ball is elevated from its seat by moving said member transversely of said outlet.

16. A valve for controlling the flow of fluid under pressure comprising a closed chamber having an outlet, a ball adapted to seat on said outlet to prevent the flow of fluid therethrough, and an actuator for moving said ball to and from said outlet, said actuator having a portion enclosing said ball at all portions thereof not engaging said seat so as to be exposed to the fluid pressure in said chamber, said actuator having another portion integral with said first mentioned portion extending through and reciprocable in an aperture in the wall of said chamber and exposed to the atmosphere.

ROY M. MAGNUSON.